(No Model.)  3 Sheets—Sheet 2.
V. OPPL.
MEANS FOR TRANSPORTING BEER.
No. 527,123.  Patented Oct. 9, 1894.
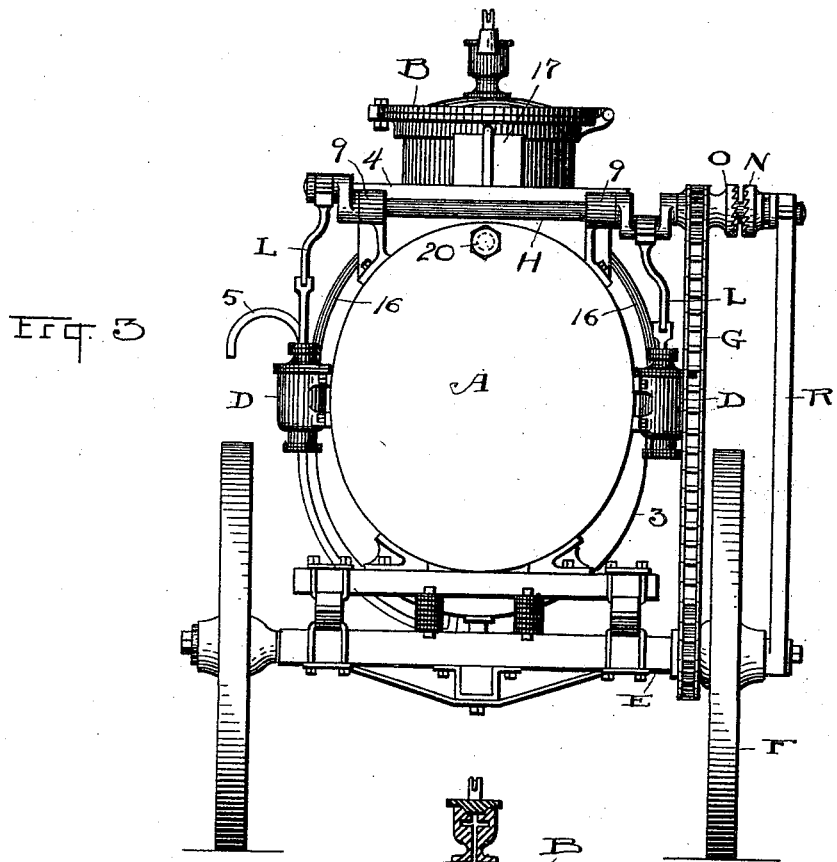
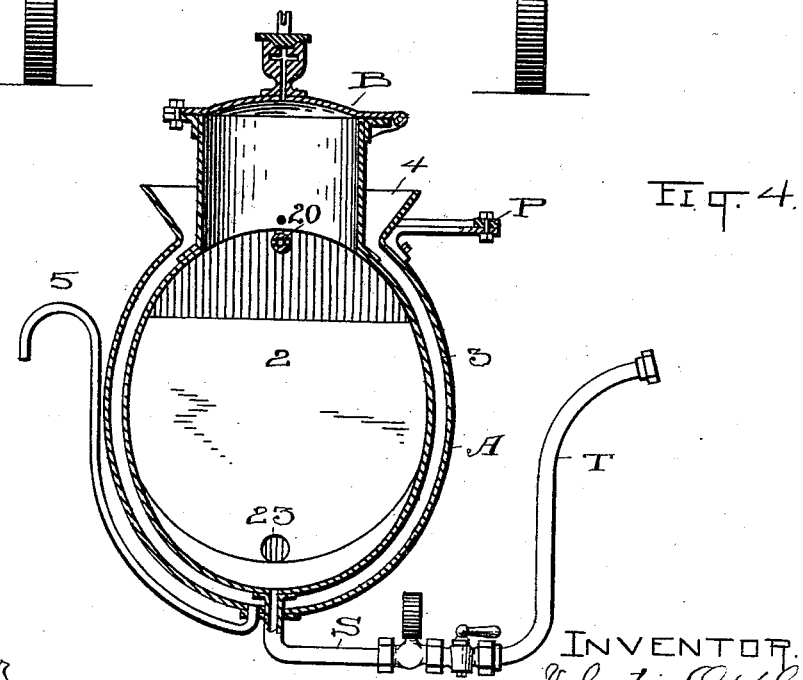

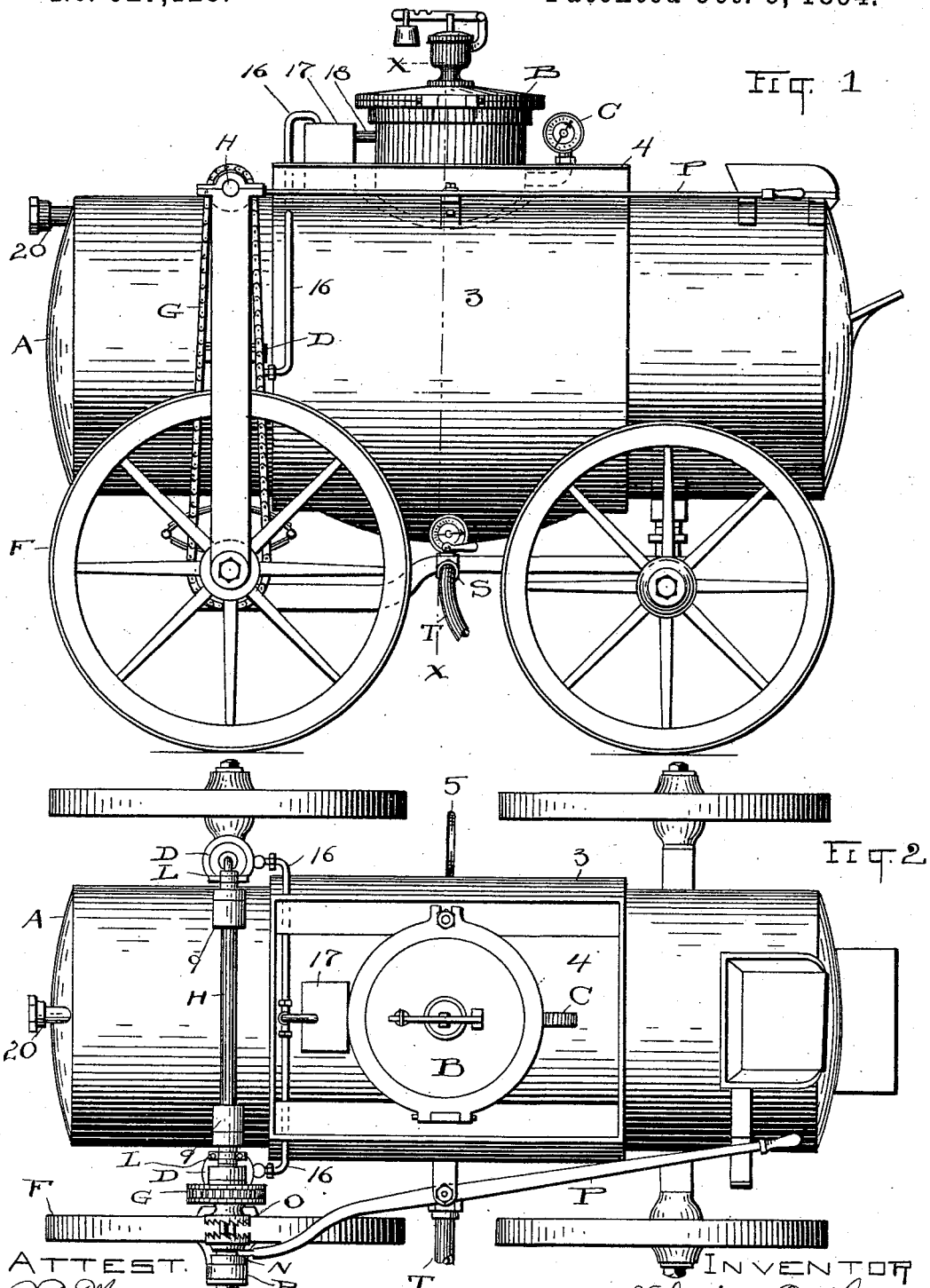

(No Model.) 3 Sheets—Sheet 3.

V. OPPL.
MEANS FOR TRANSPORTING BEER.

No. 527,123. Patented Oct. 9, 1894.

ATTEST.
R. B. Moser.
J. S. Scharffer

INVENTOR
Valentin Oppl.
By H. J. Fisher ATTORNEY

UNITED STATES PATENT OFFICE.

VALENTIN OPPL, OF CLEVELAND, OHIO.

MEANS FOR TRANSPORTING BEER.

SPECIFICATION forming part of Letters Patent No. 527,123, dated October 9, 1894.

Application filed May 11, 1894. Serial No. 510,876. (No model.)

*To all whom it may concern:*

Be it known that I, VALENTIN OPPL, a citizen of the United States, residing at Cleveland, in the county of Cuyahoga, and State of Ohio, have invented certain new and useful Improvements in Means for Transporting Beer; and I do hereby declare that the following is a full, clear, and exact description of the invention, which will enable others skilled in the art to which it appertains to make and use the same.

My invention relates to means for transporting beer, and the invention consists in a four-wheeled vehicle having a tank permanently thereon, pumps connected with the tank and power mechanism to operate the pumps, substantially as shown and described and particularly pointed out in the claim.

Figure 5:
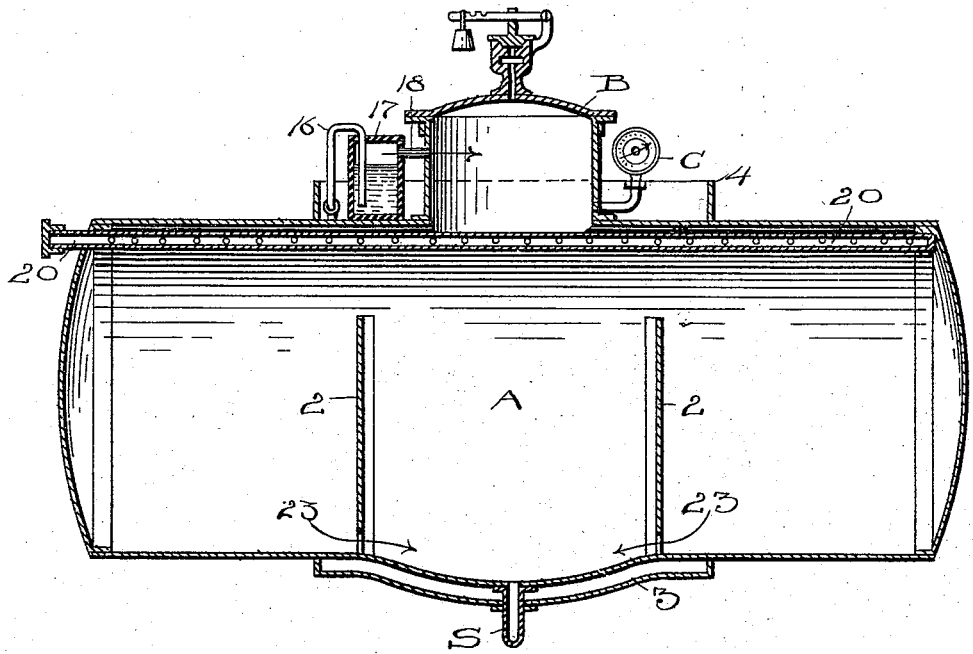
Figure 6:
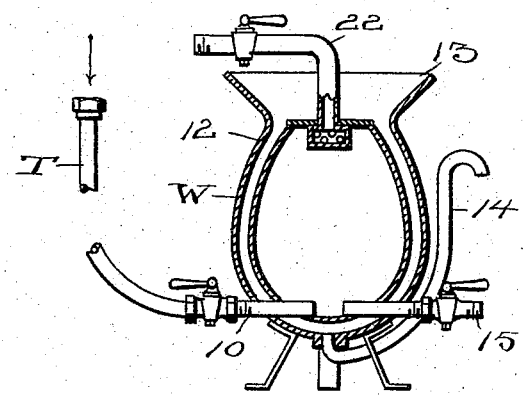

In the accompanying drawings, Figure 1 is a side elevation of my improved vehicle with the tank and its attachments thereon, and Fig. 2 is a plan view of Fig. 1. Fig. 3 is a rear end elevation of the vehicle or wagon and tank shown in Figs. 1 and 2. Fig. 4 is a vertical central sectional elevation of the tank itself taken on a line corresponding to $x, x$, Fig. 1. Fig. 5 is a longitudinal vertical central sectional elevation of the tank detached from the wagon. Fig. 6 is a vertical central sectional elevation of a receiving receptacle designed to take the place of the beer keg in a saloon, and having pipe connections with which the hose from the tank on the wagon may be connected to pump the beer into the receptacle when it is to be filled.

A represents the tank, which is supported upon the wagon in any suitable way, and is permanently located thereon. This tank is designed to carry beer and to deliver the same from place to place as the trade may require, and takes the place of the beer keg, in which the beer hitherto has been transported from the brewery to the saloon. It may be made larger or smaller according as it is found convenient to take larger or smaller loads, or as the conditions of the trade may demand, and has certain features of construction which adapt it especially to this service as will now appear. Thus, for example, I place therein two division walls —2— at certain intervals to break the rolling back and forth of the liquid in the tank. Again, in order that the beer may be kept cool in warm weather, I provide a liquid belt —3— around the body of the tank with a hopper or receptacle —4— at the top to receive broken ice. This belt has an overflow tube —5—, Fig. 4, which comes to a level substantially with the division walls —2— or near the top of the tank and discharges onto the ground as overflow may occur. Centrally in the top of the tank is a man-hole B with safety valve mechanism resembling that of a steam engine, or its equivalent in construction and effect, so as to relieve the pressure in the tank when it becomes excessive. I also employ a pressure gage C, as seen in Fig. 1, by which the driver can tell at any time what the pressure in the tank is and relieve or increase the same as may be required.

Now, in order that atmospheric pressure may be introduced and maintained in the tank as beer is withdrawn, I show here a set of pumps D on opposite sides of the tank at the rear thereof, and over the axle E, and operate the said pumps from the hub of wheel F on the rear axle by means of a sprocket chain G engaged on a sprocket wheel fixed upon said hub and running over another sprocket wheel on the shaft H. This shaft H has a crank for each pump and a pitman L fixed thereon, and the pumps are operated whenever the wagon is in motion and the sliding clutch N is engaged with the clutch O, which is rigid and turns with the shaft H. The clutch N is movable to engage and disengage the other clutch member O, and a lever P running forward in convenient reach of the driver serves to control the said sliding clutch so that the driver can put the pumps in operation or out of operation whenever he sees fit. The shaft H is supported upon suitable brackets —9— upon the tank and at its clutch end by an upright R from the outer extremity of axle E. This upright might be dispensed with if other suitable supports for that extremity of the shaft were provided from the tank.

The beer is forced into the tank by any suitable pump or other means which may be found available at the brewery or place where the tank is located. Ordinarily force pumps operated by steam or otherwise are employed and the beer is conveyed into the tank through the bottom thereof, which has pipe connection S fixed thereto and extending laterally and provided with a flexible hose connection T which is adapted to make connection with the pipes or hose leading to or from the building.

The channel S serves both as a medium for pumping the beer into the tank and drawing it therefrom, and hose connections are made in like manner in each case; but when beer is discharged from the tank it is carried out under the pressure in the tank to the receptacle therefor in the saloon as shown at W, Fig. 6. This receptacle or cask has hose or pipe connection —10— through which the beer is received into the same, and has a cooling jacket —12— about it with an ice hopper —13— and an overflow pipe —14—. The beer is drawn through the pipe —15— having a suitable cock or valve to control the same.

It should have been stated that the air from the pumps D is discharged into the tank through tubes or pipes —16—, which empty into a water reservoir or chamber —17—, Fig. 5, thus cleansing the air of impurities before it passes into the tank over the beer. This reservoir is connected by a pipe —18— with the dome of the tank and serves as a man-hole as before described.

For the purpose of cleansing and purifying the tank from time to time after it has been in service, I employ a perforated steam conveying pipe —20— running longitudinally thereof along its top and extending out of the tank at one end to make steam connections so that I may introduce a volume of steam or hot water or both at the same time through this pipe and clean the tank. A similar connection or medium is shown at —22— in Fig. 6 to cleanse the beer receptacle W.

The division walls —2— in the tank have one or more openings —23— at their bottom so as to permit the flow of beer at the bottom without obstruction on account of these walls.

By the means herein described, I may be enabled to work very material economy in the transportation of beer because I dispense with the personal handling of the beer kegs as well as with the large investment in the kegs which breweries are obliged to make when they employ the keg as the medium for reaching the customer. By my system each customer has his own beer receptacle or receptacles which may be of any desired size and number, and he can have one or more of them filled, as he chooses. He can also have the usual atmospheric pump connections therewith to keep up the pressure and the life of the beer if he wishes. The brewery is simply put to the expense of the wagon, which it must have anyway, with a driver and horses and the tank which takes the place of the kegs in transportation is comparatively cheap and of long and during service.

Obviously the wagon and tank described need not necessarily be confined to hauling beer, as it can be used to convey other liquids, but it is constructed and designed especially for beer.

I have shown the pumps D with means connected with one of the hubs of the rear wheels through which power is derived to operate said pumps, but power derived from any other available source that is found practicable may be used, or there may be some different connection on the wagon for getting the power which would amount to substantially the same thing.

I have shown and described two pumps, one at each side of the tank. I may use one or more pumps and I may arrange them differently from what I show in the drawings. For example, they may lie longitudinally at the side of the tank inside or they might be over the axle of the vehicle as here shown.

Having thus described my invention, what I claim is—

The vehicle and the tubular tank supported across the front and rear axles of the vehicle and having a valved opening in its bottom and an air opening in its top, in combination with air pumps at the side of said tank and power connections between the said pumps and one of the wheels of the vehicle consisting of a crank shaft across the rear of the tank, pitmen from said shaft to the pumps and sprocket chain connections from the said shaft to one of the rear wheels of the vehicle, substantially as set forth.

Witness my hand to the foregoing specification.

VALENTIN OPPL.

Witnesses:
R. B. MOSER,
GEORGIA SCHAEFFER.